US010707719B2

(12) United States Patent
Modi et al.

(10) Patent No.: US 10,707,719 B2
(45) Date of Patent: Jul. 7, 2020

(54) INSULATIVE INSERT FOR MOTOR CONTROLLER CAN

(71) Applicant: Nidec Motor Corporation, St. Louis, MO (US)

(72) Inventors: Chetan O. Modi, Valley Park, MO (US); Douglas D. Glenn, Highland, IL (US); Jeffrey S. Sherman, Creve Coeur, MO (US); James L. Skinner, Collinsville, IL (US)

(73) Assignee: Nidec Motor Corporation, St. Louis, MO (US)

( * ) Notice: Subject to any disclaimer, the term of this patent is extended or adjusted under 35 U.S.C. 154(b) by 393 days.

(21) Appl. No.: 15/640,070

(22) Filed: Jun. 30, 2017

(65) Prior Publication Data

US 2018/0006519 A1  Jan. 4, 2018

Related U.S. Application Data

(60) Provisional application No. 62/357,699, filed on Jul. 1, 2016.

(51) Int. Cl.
*H02K 5/04* (2006.01)
*H02K 11/33* (2016.01)
*H02K 5/22* (2006.01)
*H01G 11/56* (2013.01)
*H02K 9/00* (2006.01)
*H01G 9/28* (2006.01)

(52) U.S. Cl.
CPC .............. *H02K 5/04* (2013.01); *H01G 11/56* (2013.01); *H02K 5/225* (2013.01); *H02K 9/00* (2013.01); *H02K 11/33* (2016.01); *H01G 9/28* (2013.01)

(58) Field of Classification Search
CPC . H02K 5/04; H02K 11/33; H02K 9/00; H02K 5/06; H02K 5/08; H02K 11/40; H02K 3/30; H01G 11/56
USPC .......................................................... 310/52
See application file for complete search history.

(56) References Cited

U.S. PATENT DOCUMENTS

| 9,093,884 | B2 * | 7/2015 | Major | D06F 37/206 |
| 9,531,231 | B2 * | 12/2016 | Modi | H02K 11/33 |
| 10,389,196 | B2 * | 8/2019 | Bastien | |
| 2015/0054365 | A1 * | 2/2015 | Kinoshita | H02K 5/10 |
| | | | | 310/71 |
| 2015/0155759 | A1 * | 6/2015 | Matsuo | H02K 9/22 |
| | | | | 310/52 |
| 2015/0216083 | A1 * | 7/2015 | Kanazawa | H02K 7/116 |
| | | | | 310/52 |

(Continued)

*Primary Examiner* — Forrest M Phillips
(74) *Attorney, Agent, or Firm* — Hovey Williams LLP

(57) ABSTRACT

A motor assembly includes a motor, a controller for controlling at least one aspect of operation of the motor, a housing, and an insulation system. The housing defines a motor chamber at least substantially receiving the motor and a controller chamber at least substantially receiving the controller. The housing includes a generally annular sidewall at least in part defining the controller chamber. The sidewall includes an electrically conductive portion adjacent the controller, such that a generally radially extending potentially electrical pathway is defined between the controller and the electrically conductive portion. The insulation system extends along the electrically conductive portion, in electrically insulative engagement therewith, to at least in part obstruct the pathway.

20 Claims, 13 Drawing Sheets

(56) References Cited

U.S. PATENT DOCUMENTS

2015/0318752 A1\* 11/2015 Collins ................. H02K 1/185
310/64
2016/0329771 A1\* 11/2016 Horng ................... H02K 1/185

\* cited by examiner

US 10,707,719 B2

INSULATIVE INSERT FOR MOTOR CONTROLLER CAN

CROSS-REFERENCE TO RELATED APPLICATIONS

1. Priority Applications

The present application claims priority from U.S. Provisional Patent Application No. 62/357,699, filed Jul. 1, 2017, and entitled INSULATIVE INSERT FOR MOTOR CONTROLLER CAN, the entire disclosure of which is hereby incorporated by reference herein.

BACKGROUND OF THE INVENTION

1. Field of the Invention

The present invention relates generally to an electric motor for use in a machine. More specifically, the present invention concerns an electric motor including a controller, a controller can housing the controller, and an insulation system for insulating the controller can from the controller.

2. Discussion of the Prior Art

Those of ordinary skill in the art will appreciate that electrical insulation of electric motors, both during normal operation and during varying types and degrees of failure, is paramount to the safety of such motors. Thus, a variety of techniques have been contemplated to reduce risk of electrical arcing and potential shock of persons associated with the motors.

SUMMARY

According to one aspect of the present invention, a motor assembly is provided. The motor assembly includes a motor, a controller for controlling at least one aspect of operation of the motor, a housing, and an insulation system. The motor includes a rotor rotatable about an axis, and a stator. The housing defines a motor chamber at least substantially receiving the motor and a controller chamber at least substantially receiving the controller. The housing includes a generally annular sidewall at least in part defining the controller chamber. The sidewall includes an electrically conductive portion adjacent the controller, such that a generally radially extending potentially electrical pathway is defined between the controller and the electrically conductive portion. The insulation system extends along the electrically conductive portion, in electrically insulative engagement therewith, to at least in part obstruct the pathway.

This summary is provided to introduce a selection of concepts in a simplified form. These concepts are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

A preferred embodiment of the present invention is described in detail below with reference to the attached drawing figures, wherein:

FIG. 5 is an exploded top view of the controller can, controller, and insulation system of FIGS. 3-4a;

Figure 1:
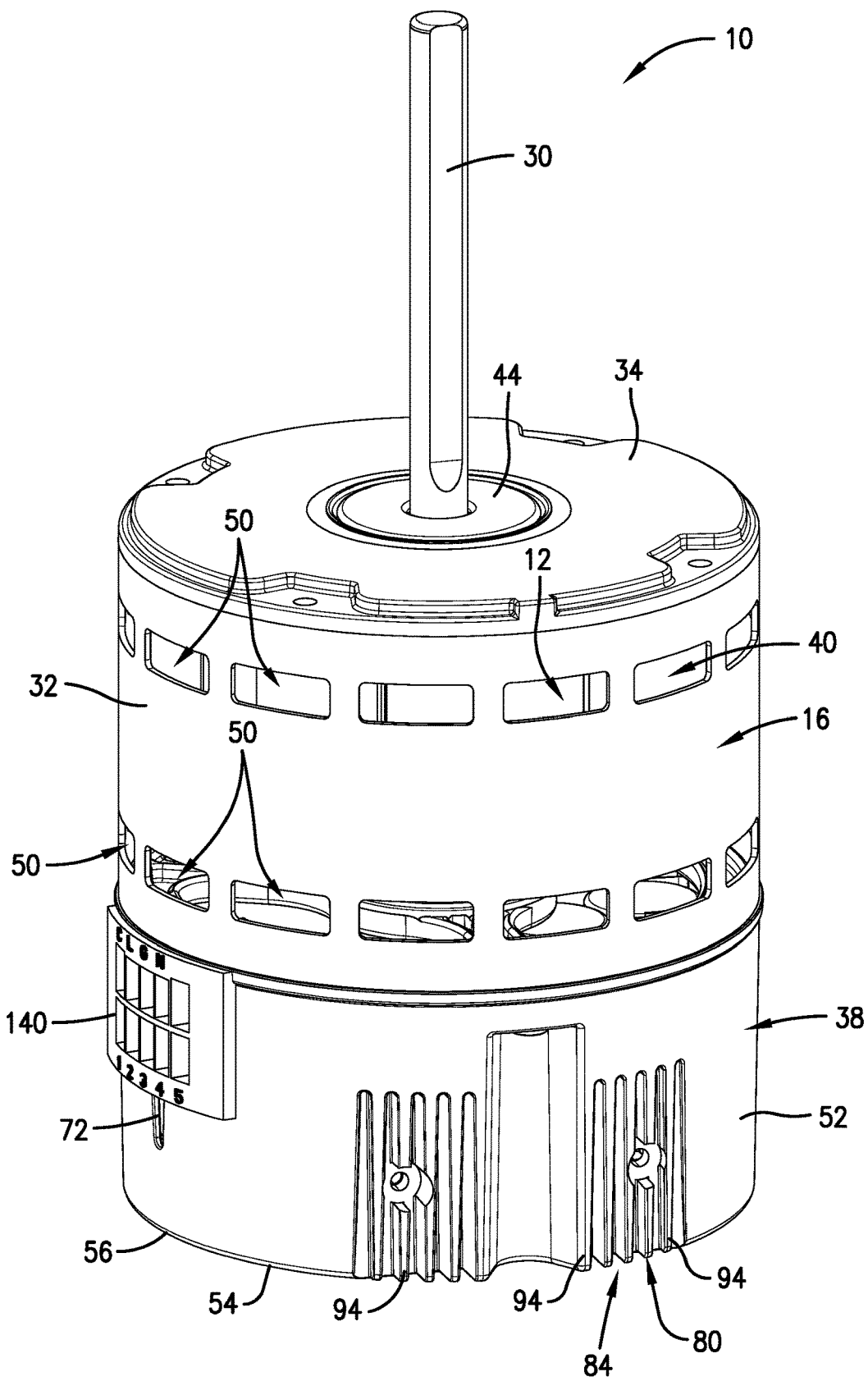
FIG. 1 is a top perspective view of a motor assembly in accordance with a preferred embodiment of the present invention.
Figure 2:
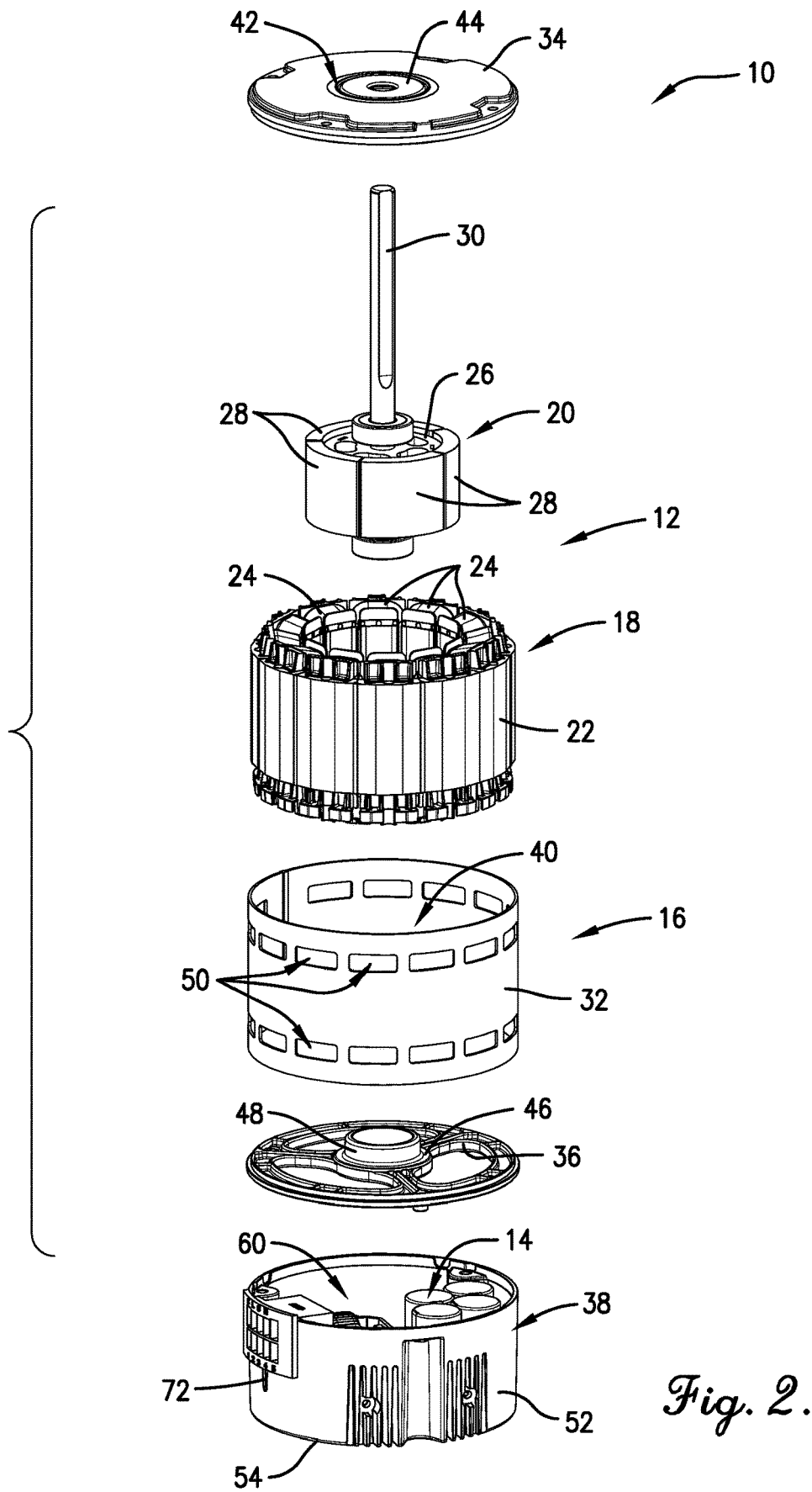
FIG. 2 is an exploded top perspective view of the motor assembly of FIG. 1.
Figure 3:
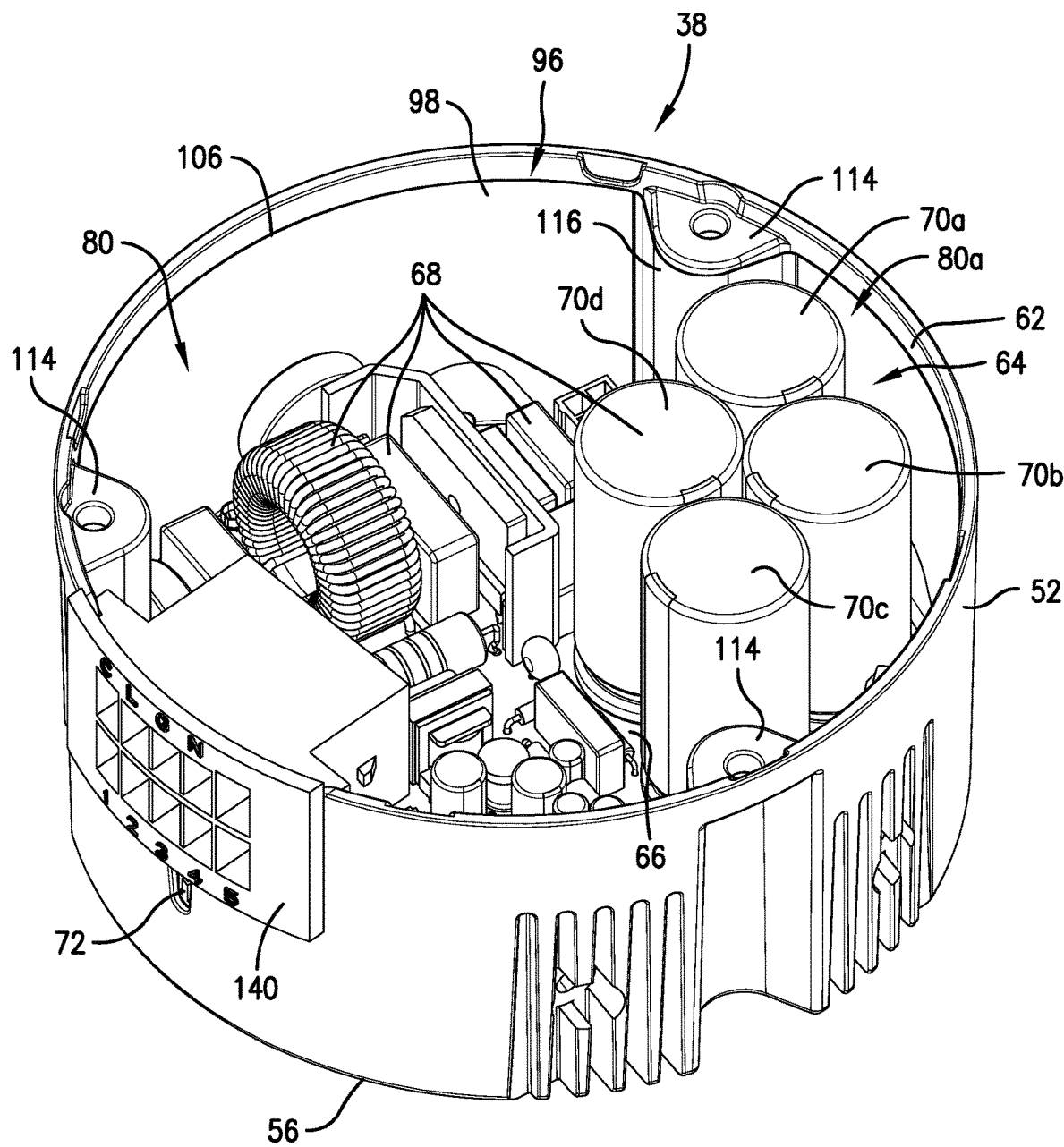
FIG. 3 is a top perspective view of the controller can, controller, and insulation system of the motor assembly of FIGS. 1 and 2.
Figure 4:
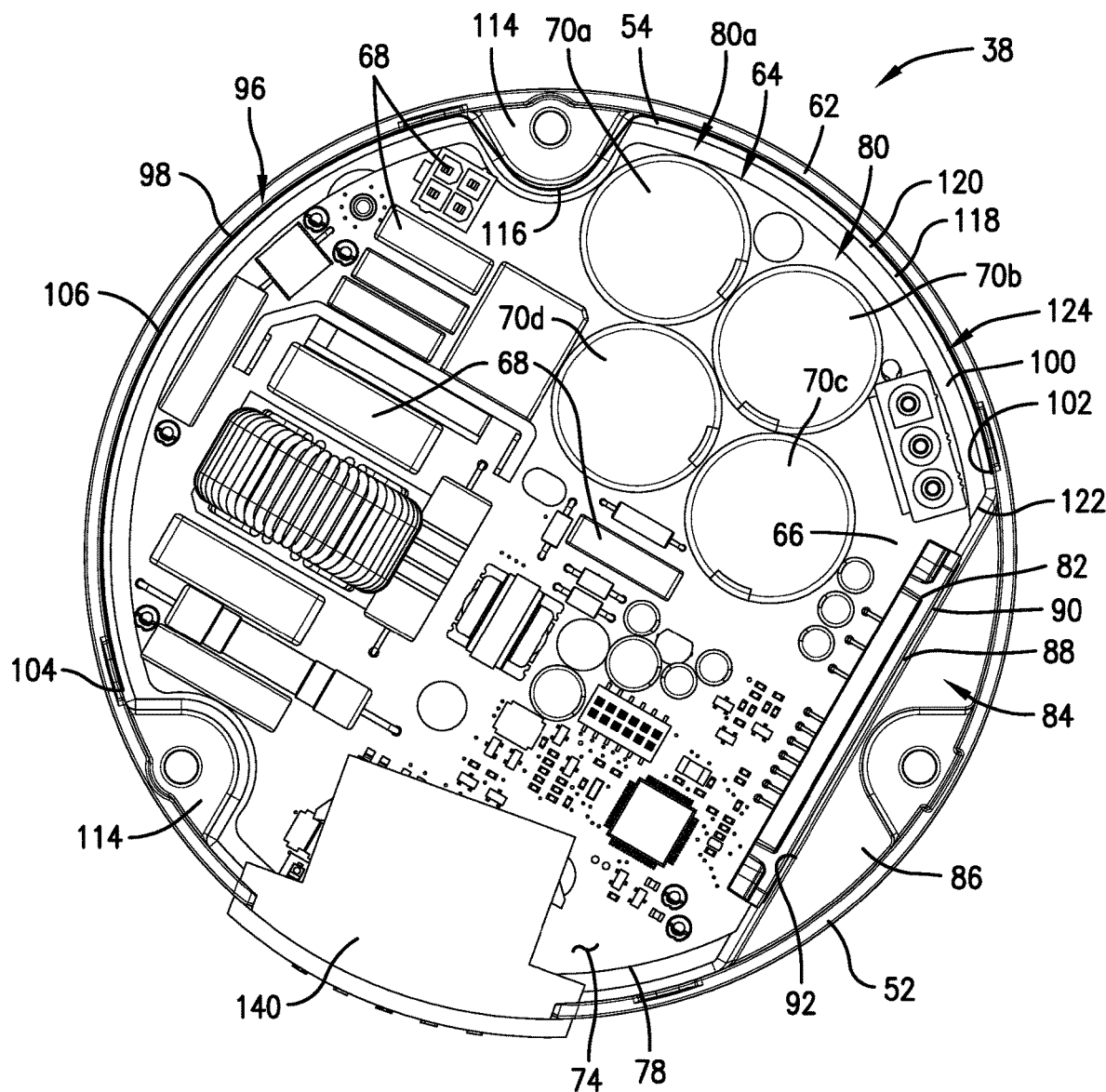
FIG. 4 is a top view of the assembled controller can, controller, and insulation system of FIG. 3.
Figure 4A:
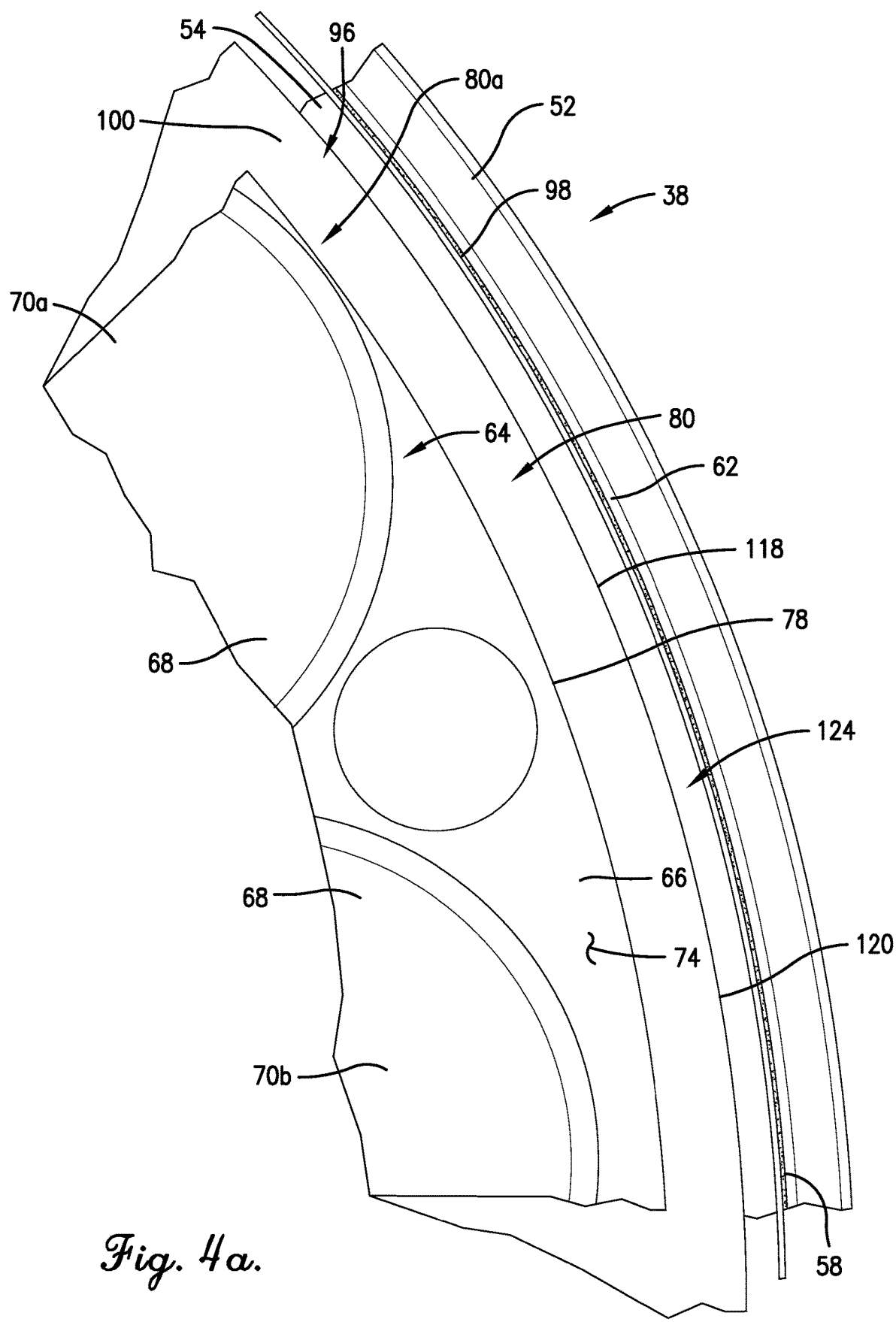
FIG. 4a is a greatly enlarged, partially fragmented view of a portion of the controller can, controller, and insulation system as shown in FIG. 4, particularly illustrating the gap between the capacitors and insulative insert.
Figure 5:
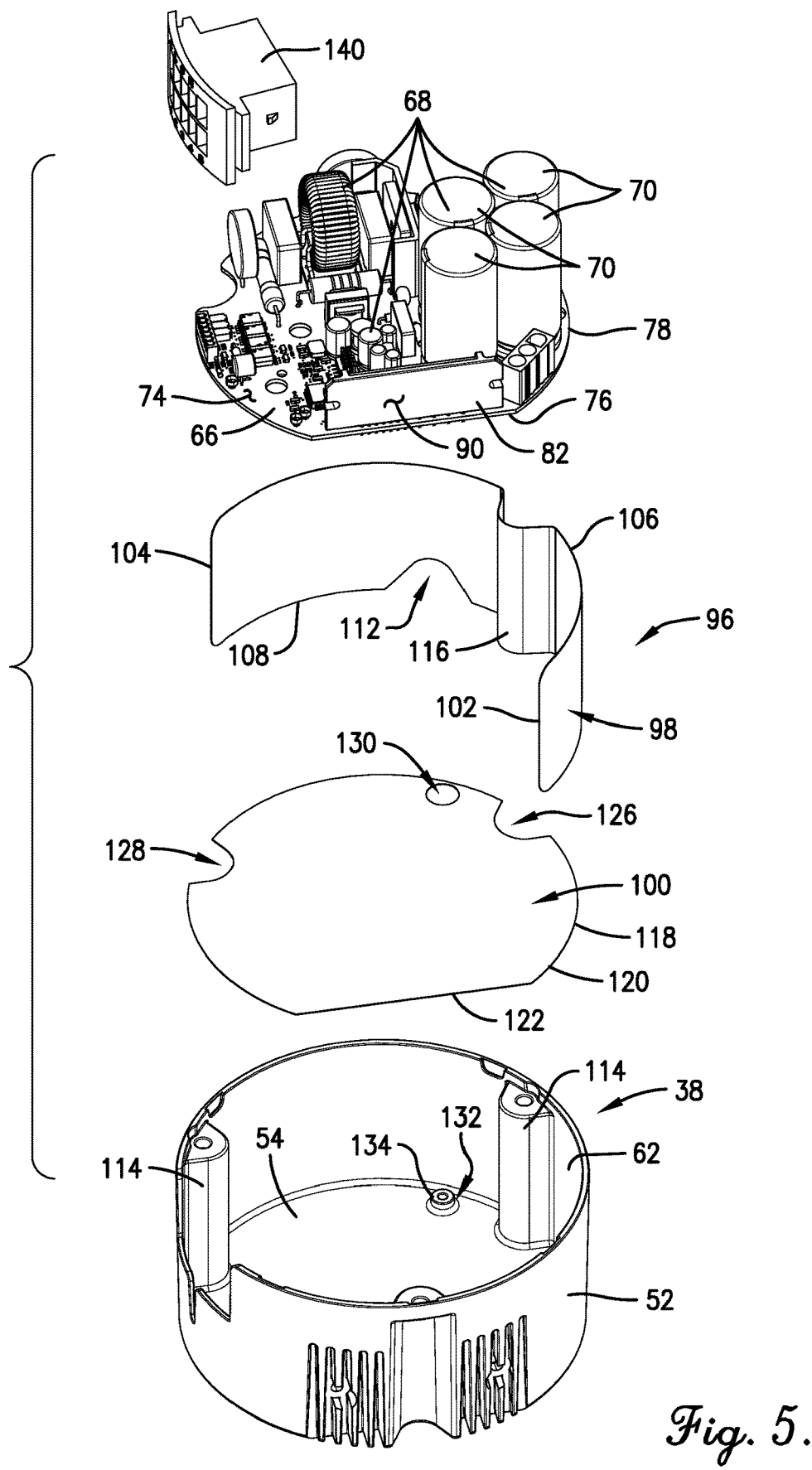
Figure 6:
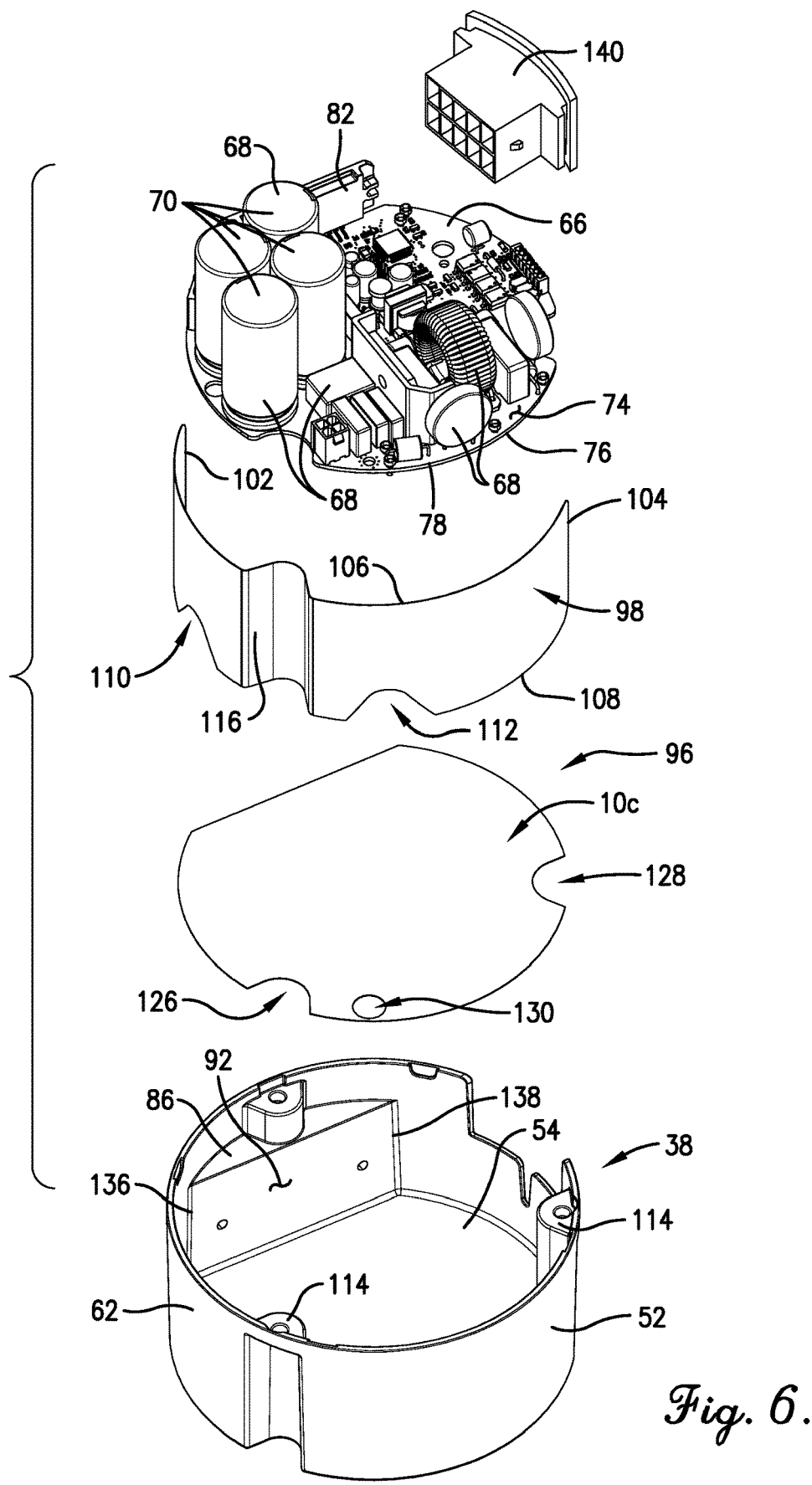
FIG. 6 is an alternative exploded top view of the controller can, controller, and insulation system as shown in FIG. 5.
Figure 7:
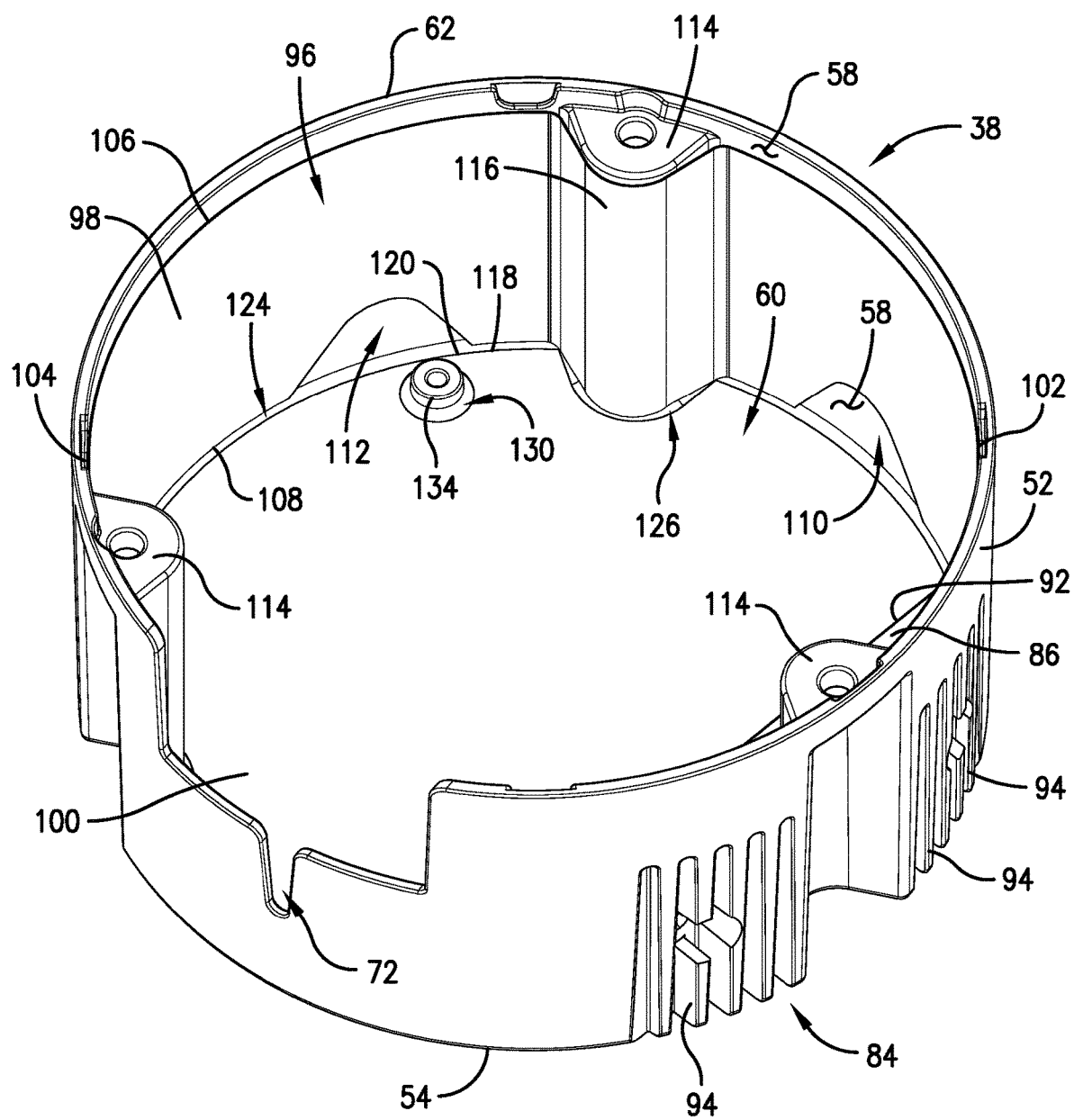
FIG. 7 is a top perspective view of the controller can and insulation system of FIGS. 1-6.
Figure 8:
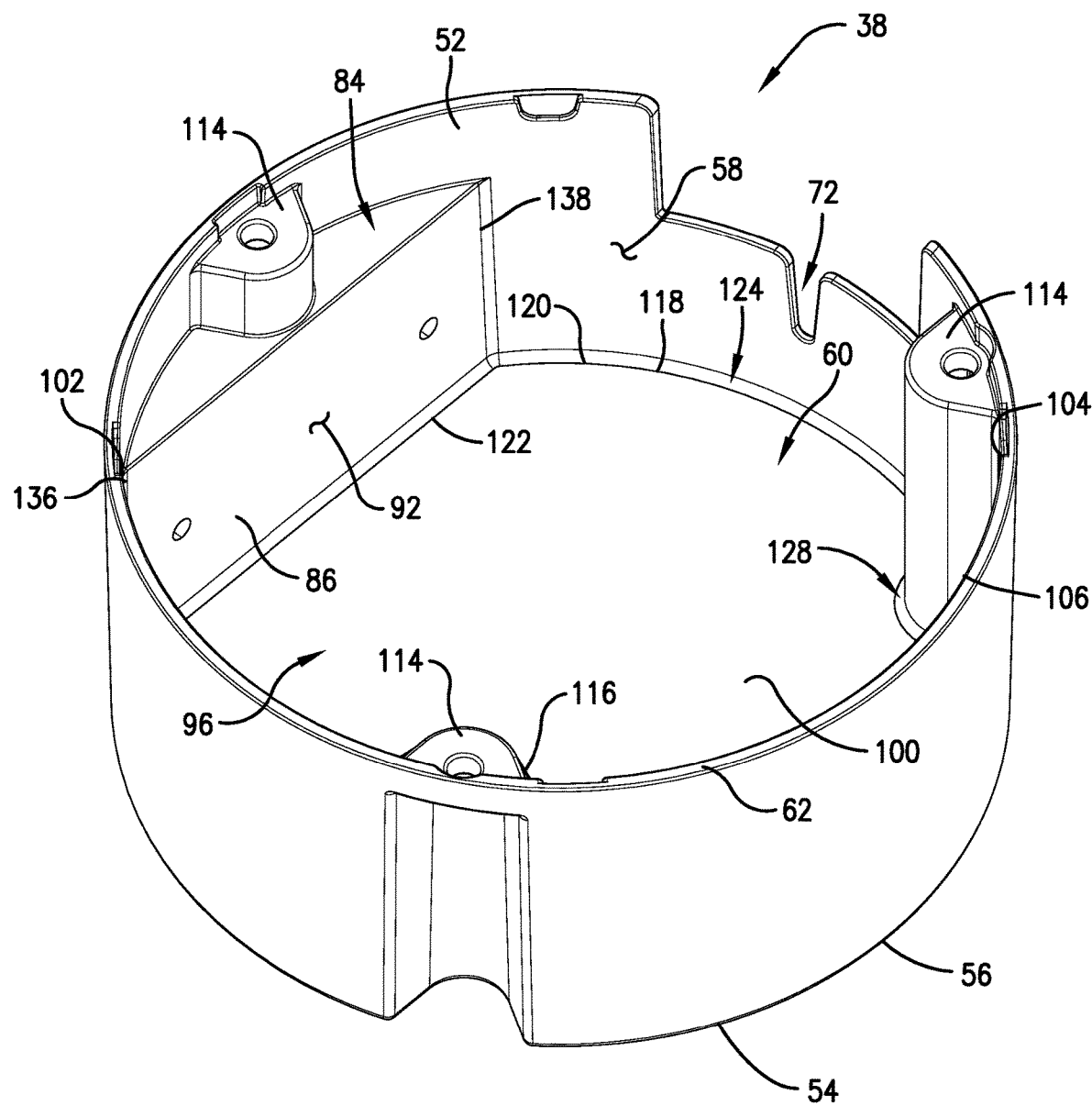
FIG. 8 is an alternative top perspective view of the controller can and insulation system as shown in FIG. 7.

The drawing figures do not limit the present invention to the specific embodiments disclosed and described herein. The drawings are not necessarily to scale, emphasis instead being placed upon clearly illustrating the principles of the preferred embodiments.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

Furthermore, it should be understood that directional references (e.g., top, bottom, upper, lower, front, back, etc.) as used herein should be understood only in a contextual sense relative to one another. For instance, a component referred to as being an upper component might, in some implementations of the present invention, instead actually be a lower component.

Turning now to FIG. 1, a motor assembly 10 is provided. The motor assembly 10 preferably includes a motor 12, a controller 14, and a housing 16.

The motor 12 preferably includes a stator 18 and a rotor 20 rotatable about an axis. The stator 18 preferably includes a stator core 22 and a plurality of coils 24 wound about the stator core 22. The rotor 20 preferably includes a rotor core 26 and a plurality of magnets 28 arranged arcuately about the rotor core 26. The rotor 20 also preferably includes a shaft 30 extending along a rotor axis. The rotor 20 as a whole is preferably rotatable about the rotor axis.

The stator 18 preferably at least substantially circumscribes the rotor 20, such that the motor 12 is an inner rotor motor. However, it is permissible according to some aspects of the present invention for the motor to be an outer rotor motor or a dual rotor motor.

The housing 16 preferably includes a motor shell 32, an external endshield 34, an internal endshield 36, and a controller can 28. The motor shell 32 is preferably generally cylindrical and circumscribes the stator 18 and the rotor core 26. The endshields 34 and 36 are preferably fixed to axially opposed ends of the motor shell 32 such that the motor shell 32 and the endshields 34 and 36 cooperatively define a motor chamber 40 that at least substantially receives the motor 12.

The endshield 34 preferably includes a bearing well 42. The bearing well 42 supports a rotor bearing 44 that rotatably supports the rotor 20. Similarly, the endshield 36 preferably includes a bearing well 46. The bearing well 46 supports a rotor bearing 48 that rotatably supports the rotor 20.

The shell 32 preferably includes a plurality of ventilation openings 50, although a closed shell is permissible without departing from some aspects of the present invention.

In a preferred embodiment, the controller can 38 includes a generally annular sidewall 52 and an end wall 54. More particularly, the end wall 54 is preferably disk-like and presents a radially outermost margin 56, with the sidewall 52 extending axially from the outermost margin 56. Alternatively stated, the sidewall 52 preferably extends generally arcuately along the radially outermost margin 56 of the end wall 54. Preferably, the sidewall 52 is generally cylindrical. For instance, the sidewall 52 preferably extends continuously arcuately to define a cylindrical inner sidewall face 58. However, it is permissible according to some aspects of the present invention for alternative shapes and/or constructions to be used. For instance, the sidewall might be generally octagonal in form or include a single flat portion adjacent a curved portion.

The sidewall 52 and the end wall 54, along with the internal endshield 36, preferably cooperatively define a controller chamber 60 at least substantially receiving the controller 14. The controller 14 will be discussed in greater detail below.

In a preferred embodiment, the endshields 34 and 36 and the end wall 54 present at least substantially equal outer diameters. Likewise, the sidewall 52 and the motor shell 32 preferably present at least substantially equal outer diameters. Thus, in a preferred embodiment, the housing 16 as a whole preferably presents a generally consistent outer cross-sectional profile. Alternatively stated, it is preferred that the sidewall 52 of the controller can 38 and the shell 32 cooperatively present a right circular cylindrical motor assembly margin.

In a preferred embodiment, the housing 16, including the controller can 38, the shell 32, and the endshields 34 and 36, comprises aluminum. However, it is permissible according to some aspects of the present invention for some or all of the housing 16 to comprise another metal or even a non-metal. Most preferably, however, at least a portion of the housing 16 comprises an electrically conductive material.

For instance, in a preferred embodiment, the sidewall 52 includes an electrically conductive portion 62 adjacent the controller 14, such that a generally radially extending potentially electrical pathway 64 is defined between the controller 14 and the electrically conductive portion 62.

Preferably, in keeping with the above-described aluminum construction of the controller can, the entirety of the controller can 38 will be understood by those of ordinary skill in the art to be electrically conductive. However, as will be discussed in greater detail below, the present invention is applicable to controller cans in which only a portion 62 or at least a portion of the sidewall 52 is electrically conductive.

It is also noted that, in controller cans having multiple electrically conductive regions or being as a whole electrically conductive, many or even infinite potentially electrical pathways might be defined. Again, however, the present invention is also applicable to configurations in which such pathways are limited by the particular conductivity properties of a subject controller can.

Still further, as will be apparent from the detailed discussions below, the use of the term "potentially electrical pathway" is to indicate a spatial region that, under certain operational circumstances might become electrified but under other operational circumstances might not be electrified. That is, a state of electrification may not be inherent to such a pathway, even when the motor is operating. However, under certain circumstances (e.g., certain failure conditions, absence of mitigating features, etc.), electrification would be possible.

The controller 14 is preferably configured to control at least one aspect of operation of the motor 12. Preferably, the controller 14 includes a printed circuit board 66 and a plurality of electronic components 68 mounted to the board 66. Among other things, the electronic components 68 include a plurality of capacitors 70.

The capacitors 70 are preferably generally grouped together rather than distributed about the area of the printed circuit board 66. In an illustrated preferred embodiment, for instance, four (4) grouped capacitors 70a, 70b, 70c, and 70d are provided. Other numbers of and distributions of capacitors fall within the ambit of the present invention, however.

The capacitors 70 are preferably electrolytic capacitors and are most preferably aluminum electrolytic capacitors.

The capacitors 70 preferably have a capacitance of between about five hundred micro-Farads (500 µF) and about one thousand, five hundred micro-Farads (1,500 µF). Most preferably, the capacitors 70 have a capacitance of about one thousand micro-Farads (1000 µF).

The capacitors 70 preferably have a voltage rating of between about one hundred volts direct current (100 VDC) and about three hundred volts direct current (300 VDC). Most preferably, the capacitors 70 have a voltage rating of about two hundred volts direct current (200 VDC).

Preferably, the capacitors 70 include an upper bus capacitor(s) and a lower bus capacitor(s). Such a configuration might, for instance, enable the shifting of voltage from the lower bus capacitor(s) to the upper bus capacitor(s) if the lower bus capacitor(s) were shorted. However, such a shift might cause an overvoltage failure of the upper bus capacitor(s) and subsequent release of electrolytic mist (see discussion below).

However, alternative capacitor types, capacitances, voltage ratings, and general configurations may be used without departing from the spirit of the present invention.

In a preferred embodiment, the electronic components 68 are potted in place relative to the board 66. Still further, at least one drainage notch 72 is provided in the sidewall 52 of the controller can 38 to enable drainage of fluid from the controller chamber 60. For instance, excess condensation formed on the controller 14 might exit the chamber 60 via the drainage notch 72. Preferred drainage facilitating features are discussed in greater detail in U.S. Provisional Patent Application No. 62/456,005, filed Feb. 7, 2017, and entitled MOTOR CONTROLLER CAN WITH SYNTHETIC HOUSING AND HEAT SINK, the entire disclosure of which is hereby incorporated by reference herein.

In a preferred embodiment, the printed circuit board 66 presents an inner face 74 from which the electronic components 68 extend, and an outer face 76 extending adjacent and preferably parallel to the end wall 54 of the controller can 38. The printed circuit board 66 preferably presents an outermost margin 78. The sidewall 52 of the controller can 38 preferably circumscribes the printed circuit board 66 and the electronic components 68 such that a generally toroidal space 80 is formed between the controller 14 and the controller can 38.

The potentially electrical pathway 64 is preferably defined between the capacitors 70 and the electrically conductive portion 62. Furthermore, the capacitor 70a is preferably disposed adjacent the electrically conductive portion 62 in such a manner that a minimum radial dimension of the space 80 and a minimum length of the pathway 64, referred to herein as a gap 80a, is defined therebetween.

As will be readily apparent to those of ordinary skill in the art, the electronic components 68 generate heat during operation of the motor 12. For instance, in the illustrated embodiment, a large concentration of heat is found during operation at a heat source 82. The controller can 38 is preferably provided with heat-dissipating structure 84 adjacent the heat source 82. More particularly, the heat-dissipating structure 84 includes a heat sink 86. A heat-transfer interface 88 is preferably cooperatively defined by the heat source 82 and the heat sink 86. In greater detail, the heat source 82 preferably presents an engagement face 90 that engages a contact face 92 of the heat sink 86 along the heat-transfer interface 88.

The heat sink 86 preferably comprises a plurality of heat-dissipating fins 94 extending lengthwise axially and radially outwardly to dissipate the heat that transfers thereto through the interface 88.

It is noted that other fin configurations or non-fin-based heat sinks are permissible without departing from the scope of some aspects of the present invention. Furthermore, in some embodiments of the present invention, dedicated heat-dissipating structure may be omitted entirely. Still further, multiple heat sinks may be provided in association with one or more heat sources. In addition, a heat source associated with a heat sink may or may not be the greatest source of heat among the electronic components.

In a preferred embodiment, the motor assembly 10 also includes an insulation system 96. The insulation system 96 is preferably configured, in a broad sense, to decrease the likelihood of electrical arcing between one or more of the electronic components 68 and the controller can 38 or, more particularly, the electrically conductive portion 62 thereof.

The insulation system 96 is more narrowly optimized to at least substantially prevent such arcing between at least one of the capacitors 70 and the electrically conductive portion 62. Such arcing might occur if, for instance, failure of one or more of the capacitors 70 were to result in leakage of electrolytic fluid into the controller chamber 60. In an overvoltage failure, for instance, relief of gas pressure produced by heating of the electrolytic fluid within the capacitor might fail to occur, resulting in rupture of the capacitor casing and release of electrolytic fluid in the form of a mist. Such suspended mist, might, in a non-insulated controller can, form an electrical pathway such as the aforementioned pathway 64 (e.g., a generally radially extending electrical pathway 64 through the gap 80a) and between the damaged capacitor and the electrically conductive portion. That is, the mist might be capable of bridging a live conductor (e.g., a circuit board) and a ground (e.g., the controller can), resulting in electrification of the motor housing. The insulation system 96 is configured to disrupt such a pathway and thereby drastically reduce the likelihood of electricity being conducted between the capacitor 70 and the electrically conductive portion 62.

Furthermore, the insulation system 96 is configured to do so in a manner that is resistant to dielectric breakdown (e.g. would be exacerbated by the release of conductive contaminants such as an electrolytic mist) or arc tracking. The insulation system 96 is also configured to do so in a manner that retains advantageous thermal transfer systems associated with the controller 14 and the controller can 38.

In a preferred embodiment, the insulation system 96 includes an at least substantially electrically insulative insert 98 extending along a generally arcuate path. More particularly, the insert 98 extends along and conforms to the electrically conductive portion 62 of the sidewall 52, in electrically insulative engagement therewith. That is, the insert 98 is disposed in the gap 80a (and, more broadly, the space 80) to interrupt or at least in part obstruct the potentially electrical pathway 64 and thereby prevent or at least substantially decrease the likelihood of arcing to the electrically conductive portion 62.

The insulation system 96 also preferably includes an at least substantially electrically insulative lining 100 disposed between the printed circuit board 66 and the end wall 54. Similarly to the insert 98, the lining 100 preferably extends along and conforms to the end wall 54, in electrically insulative engagement therewith. That is, the lining 100 interrupts or at least in part obstructs any potential electrical pathways between the controller 14 and the end wall 54, and thereby prevents or at least substantially reduces the likelihood of arcing to the end wall 54.

The insert 98 and the lining 100 are preferably discrete components (i.e., formed independently of one another and of the other components of the motor assembly 10 so as to be in the form of self-embodied liners). However, it is permissible according to some aspects of the present invention for the insert and lining to be connected to one another after assembly or even integrally formed with each other while remaining discrete from the controller can 38 and other motor components. Furthermore, it is noted that it is permissible according to some aspects of the present invention for the insulation system to additionally and, in some instances, alternatively include non-discrete components. For instance, the insulation system might include powder coating along at least portions of the end wall and/or sidewall of the controller can, in addition to or instead of the aforementioned discrete insert and/or lining. As discussed in greater detail below, however, it is most preferred that at least the insert 98 and most preferably both the insert 98 and the lining 100 be discrete, self-embodied structures.

More particularly, the insert 98 and the lining 100 each preferably comprise a substantially continuous sheet of insulative material. Still further, the insert 98 and the lining 100 each preferably extend generally regularly (i.e., along smooth curves or planes, respectively). However, discontinuities or irregularities associated with relevant adjacent structures (e.g., of the controller 14 or controller can 38 may be necessary).

In a preferred embodiment, for instance, the insert 98 preferably extends arcuately to present arcuately spaced apart insert ends 102 and 104. The insert 98 also presents top and bottom edges 106 and 108 extending between and interconnecting the ends 102 and 104. A pair of cutouts 110 and 112 extend axially upwardly from the bottom edge 108.

Furthermore, the controller can 38 preferably includes a plurality of fastener-receiving bosses 114 each configured to receive a fastener (not shown) for securing the controller can 38 relative to the motor 12. The bosses 114 preferably extend axially from the end wall 54 and radially inwardly from the sidewall 52. The insert 98 preferably includes a radially inward projection 116, extending from the top edge 106 to the bottom edge 108, and corresponding to one of the fastener-receiving bosses 114. The projection 116 preferably extends along the corresponding boss 114 in a overlying manner.

The lining 100 preferably presents an outer margin 118 including a curved portion 120 and a straight portion 122 extending between and interconnecting the ends of the curved portion 120. The curved portion 120 preferably defines an arc of a circle having a slightly smaller diameter than that of the end wall 54 and sidewall 52, as well as of the insert 98. A gap 124 is thus formed between the lining 100 and whichever of the sidewall inner face 58 or the insert 98 is adjacent the lining 100 at the given location.

A pair of radially inward cutouts 126 and 128 extend from the outer margin 118 to accommodate the aforementioned bosses 114. Furthermore, an aperture 130 is provided through the lining 100. The aperture 130 corresponds to a fastener-receiving opening 132 in the end wall 54 of the controller can 38. A fastener 134 preferably extends through the aperture 130 and the fastener-receiving opening 132 to at least in part secure the lining 100 to the end wall 54.

In a preferred embodiment, the insert 98 and the lining 100 may comprise any of a variety of electrically insulative materials. For instance, in a preferred embodiment, the insert 98 and the lining 100 each comprise Mylar®. However, it is permissible according to some aspects of the present invention for an alternative biaxially-oriented polyethylene terephthalate, a polyethylene terephthalate in general, or some other type or types of insulative material (such as selected polymers and other materials well known in the art) to alternatively or additionally be used. For instance, the insert 98 and/or the lining 100 might comprise an acetal resin, acetate tape, acrylic, acrylonitrile butadiene styrene (abs), aromatic polyamide, beryllium oxide, ceramic, acetate, copolyester, Dacron®, Delrin®, epoxy resin, epoxy/fiberglass, fiber tape, fiberglass mat, fiberglass sheet, fishpaper, fluoropolymer, glass cloth electrical tape, glass insulation, Kapton®, Kynar®, Lexan®, Lucite®, melamine, merlon, mica, neoprene (polychloroprene), Nomex®, Noryl®, nylon, phenolic, Plexiglass®, polymethyl methacrylate (PMMA), polyacetal, polyamide-imide, polyamide, polycarbonate, polyester laminate, polyester, polyetherimide, polyethylene terephthalate glycol-modified (PTEG), polyethylene, polyformaldehyde, polyimide film, polyolefin, polyolefins, polyoxymethylene, polyphenylene, polysiloxanes, polystyrene, polysulfone, polytetrafluoroethylene, polyurethane, polyvinylchloride (pvc), polyvinylidene fluoride, semi-aromatic polyamide, silicates, silicone resin, silicone rubber, Teflon®, Torlon®, transformer paper, Udel®, Ultem®, Vespel®, vinyl tape, white cotton cloth tape, and/or mixtures/combinations thereof.

Most preferably, however, the insert 98 and the lining 100 are constructed in the form of thin inserts formed from generally parallel-sided, generally smooth sheets having at least substantially similar inner and outer surfaces. Such inserts are preferably generally not intrusive (e.g., to other motor components) and are inexpensive to install.

Preferably, the desired final generally arcuate shape of the insert 98 is partially pre-formed in or inherent to the insert 98. That is, the insert 98 just prior to placement in the controller can 38 has an initial generally arcuate shape. Such initial shape is modified (e.g., the radius of curvature is made smaller) upon insertion into the can, with the insert 98 then returning partway to its initial shape so as to ultimately apply a spring force against the sidewall 52 after assembly is complete. Such force preferably assists in securement of the insert 98 against the sidewall 52.

In a preferred method of preparation, the insert 98 is initially simply a flat sheet, with curvature and the projection 116 being added thereafter via an appropriate process such as heat-assisted molding, etc.

Preferably, the insert 98 is additionally secured to the sidewall 52 by an adhesive 99, although it is permissible according to some aspects of the present invention for such adhesive to be omitted. Most preferably, the insert 98 is formed of a Mylar® sheet 98a that includes pre-applied adhesive 99.

Similarly, the lining 100 is additionally secured to the end wall 54 by an adhesive 101, although it is permissible according to some aspects of the present invention for such adhesive to be omitted. Most preferably, the lining 100 is formed of a Mylar® sheet 100a that includes pre-applied adhesive 101.

As noted previously, the controller 14 includes the heat source 82. The controller can 38 includes the heat-dissipating structure 84, including the heat sink 86, adjacent the heat source 82. The heat-transfer interface 88 is defined between the heat sink 86 and the heat source 82. Preferably, the insert 98 and the lining 100 are each disposed in a non-overlapping manner relative to the heat transfer interface 88.

More particularly, the heat transfer interface 88 and the heat-dissipating fins 94 are preferably disposed radially outside the lining 100 and arcuately between (although perhaps radially offset relative to) the ends 102 and 104 of the insert 98. That is, the insert 98 and the lining 100 are sized and positioned so as to not interfere with transfer of heat from the controller 14 to the heat-dissipating structure 84 via the heat transfer interface 88.

Figure 9:
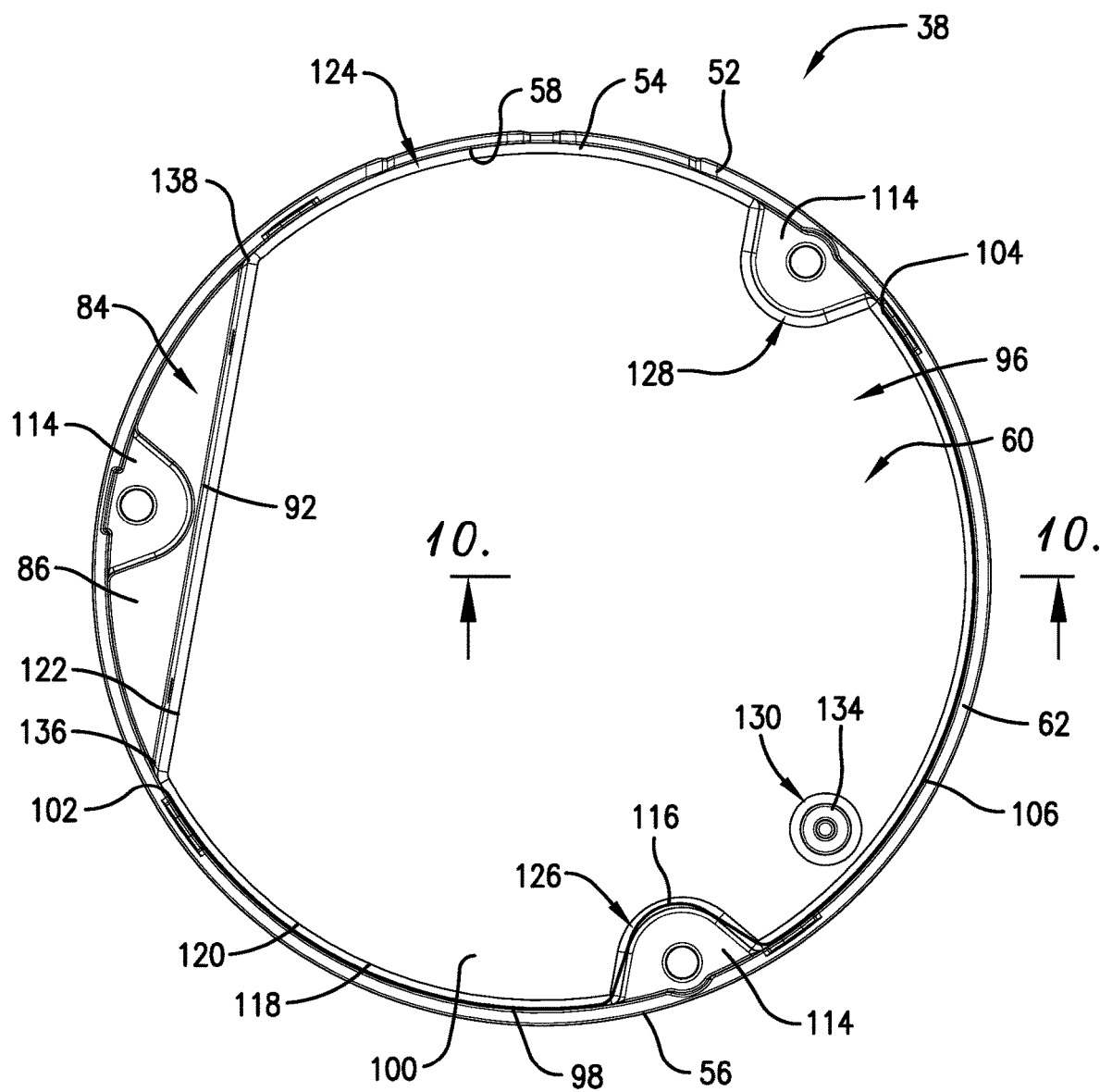
FIG. 9 is a top view of the controller can and insulation system as shown in FIGS. 7 and 8.
Figure 10:
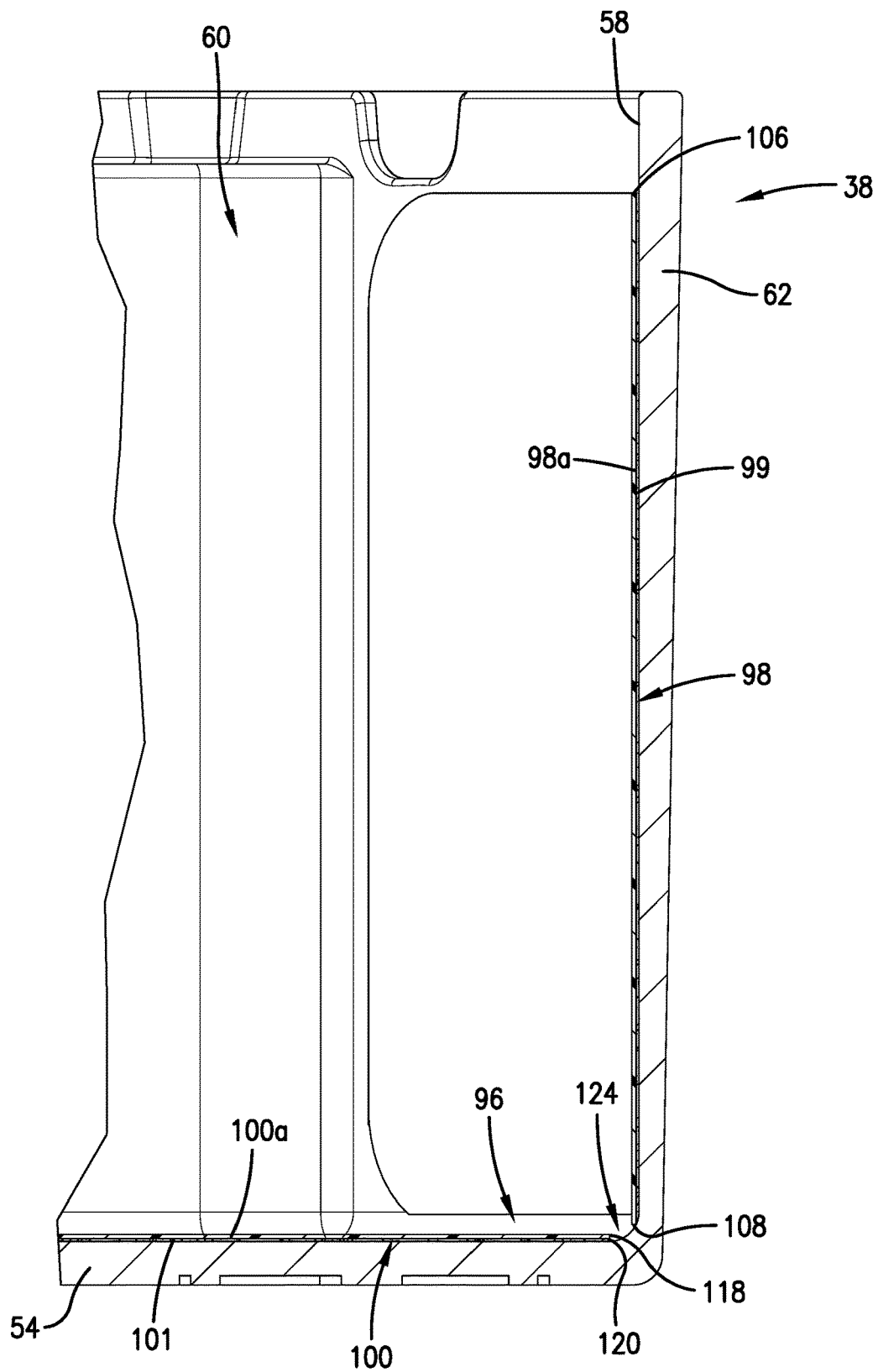
FIG. 10 is a partially fragmented cross-sectional side view of the controller and insulation system, taken along line 10-10 of FIG. 9.

In greater detail, and as best shown in FIG. 9, the straight portion 122 of the lining 100 preferably extends parallel to and slightly radially inwardly of the contact face 92 of the heat sink 86.

In a complementary manner, the insert 98 preferably extends about and conforms to only a portion of the sidewall inner face 58. More particularly, the insert 98 most preferably extends arcuately between about one hundred fifty (150) degrees and about two hundred ten (210) degrees and most preferably extends about one hundred eighty (180) degrees. Furthermore, the insert 98 is positioned such that the end 102 is slightly arcuately spaced from a first edge 136 of the contact face 92. The insert 98 as a whole then extends arcuately way from the contact face 92 and terminates with the opposite end 104 spaced arcuately from a second edge 138 of the contact face 92. As illustrated, the ends 102 and 104 are spaced from each other across the contact face 92 and beyond (e.g., past a cable interface 140) by about ninety (90) degrees, although it is permissible according to some aspects of the present invention for such spacing to vary.

It is particularly noted that the extent to which electrically conductive portions of the controller can 38 remain exposed to the controller chamber 60 (i.e., portions that are covered by neither the insert 98 nor the lining 100) is preferably such than an optimal balance of electrical arcing mitigation versus heat removal is achieved. That is, while exposed electrically conductive surfaces advantageously aid in effective transfer of heat away from the controller, such surfaces disadvantageously provided potential end points for electrical arcs across the chamber 60. Although the insulation system 96 minimizes arcing risk by disrupting the potentially electrical pathway 64 at the most likely arcing points (e.g., immediately adjacent the capacitors 70), "successful" arcs might nevertheless travel greater distances than would have been required absent the insulation system 96 to electrify the motor housing 16. That is, the insulation system 96 greatly reduces the risk of arcing (by at least lengthening the arc travel distance) while improving thermal energy transfer away from the controller 14.

Figure 11:
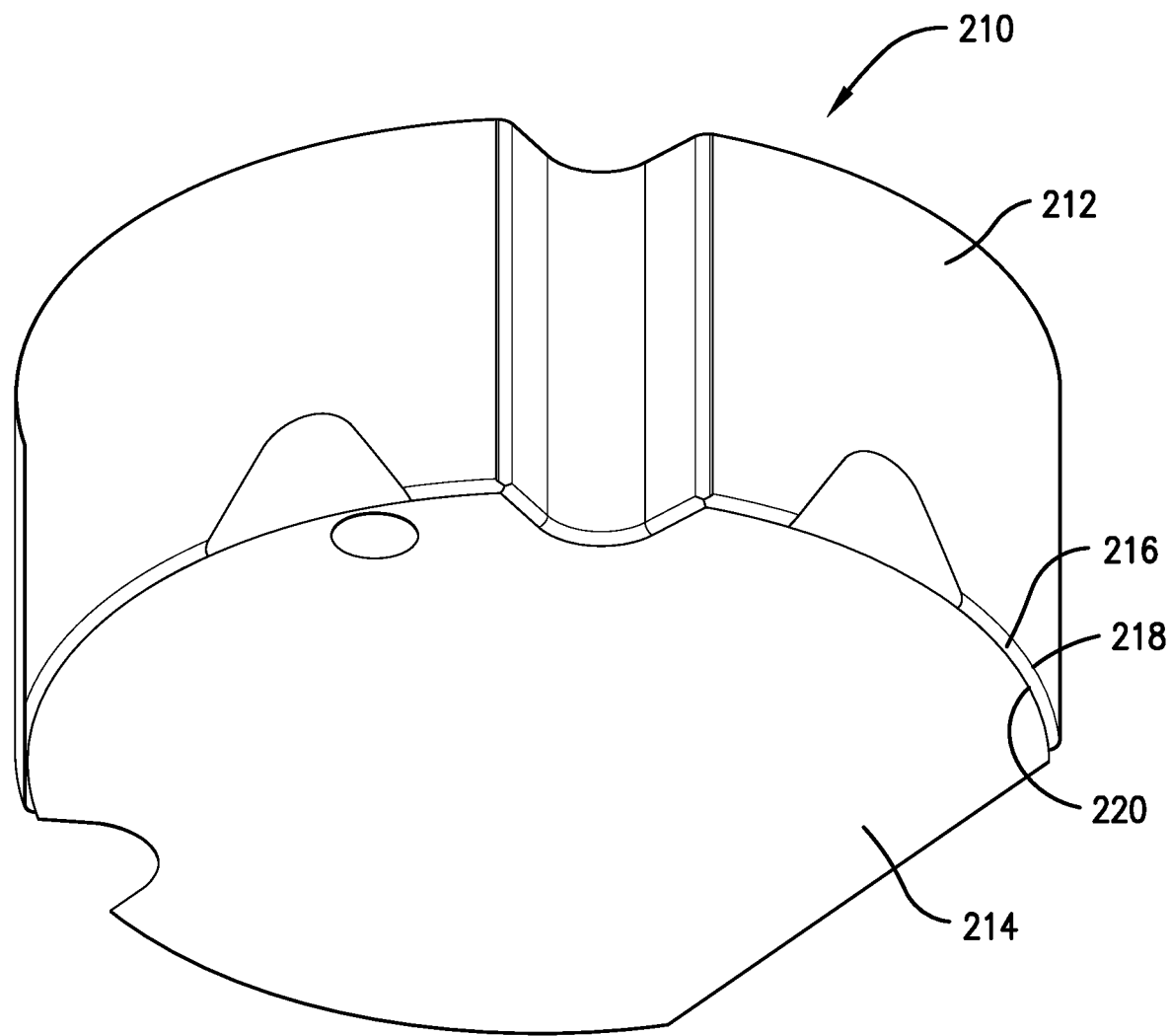
FIG. 11 is bottom perspective view of an insulation system in accordance with a second preferred embodiment of the present invention.

A second preferred embodiment of the present invention is shown in FIG. 11. It is initially noted that, with certain exceptions to be discussed in detail below, many of the elements of the insulation system 210 of the second embodiment are the same as or very similar to those described in detail above in relation to the insulation system 96 of the first embodiment. Therefore, for the sake of brevity and clarity, redundant descriptions and numbering will be generally avoided here. Unless otherwise specified, the detailed descriptions of the elements presented above with respect to the first embodiment should therefore be understood to apply at least generally to the second embodiment, as well.

Similarly to the insulation system 96 of the first preferred embodiment, the insulation system 210 of the second preferred embodiment includes an insert 212 and a lining 214. However, in contrast to the separate insert 98 and lining 100 of the first embodiment, the insert 212 and the lining 214 of the second preferred embodiment are integrally formed with one another. More particularly, an interconnecting bridge 216 is provided between a bottom edge 218 of the insert 212 and an outer margin 220 of the lining 214. The generally continuous construction of the entire insulation system 210 (as particularly facilitated by the bridge 216) further reduces the risk of arcing relative to a multi-component system such as the insulation system 96 of the first preferred embodiment.

Figure 12:
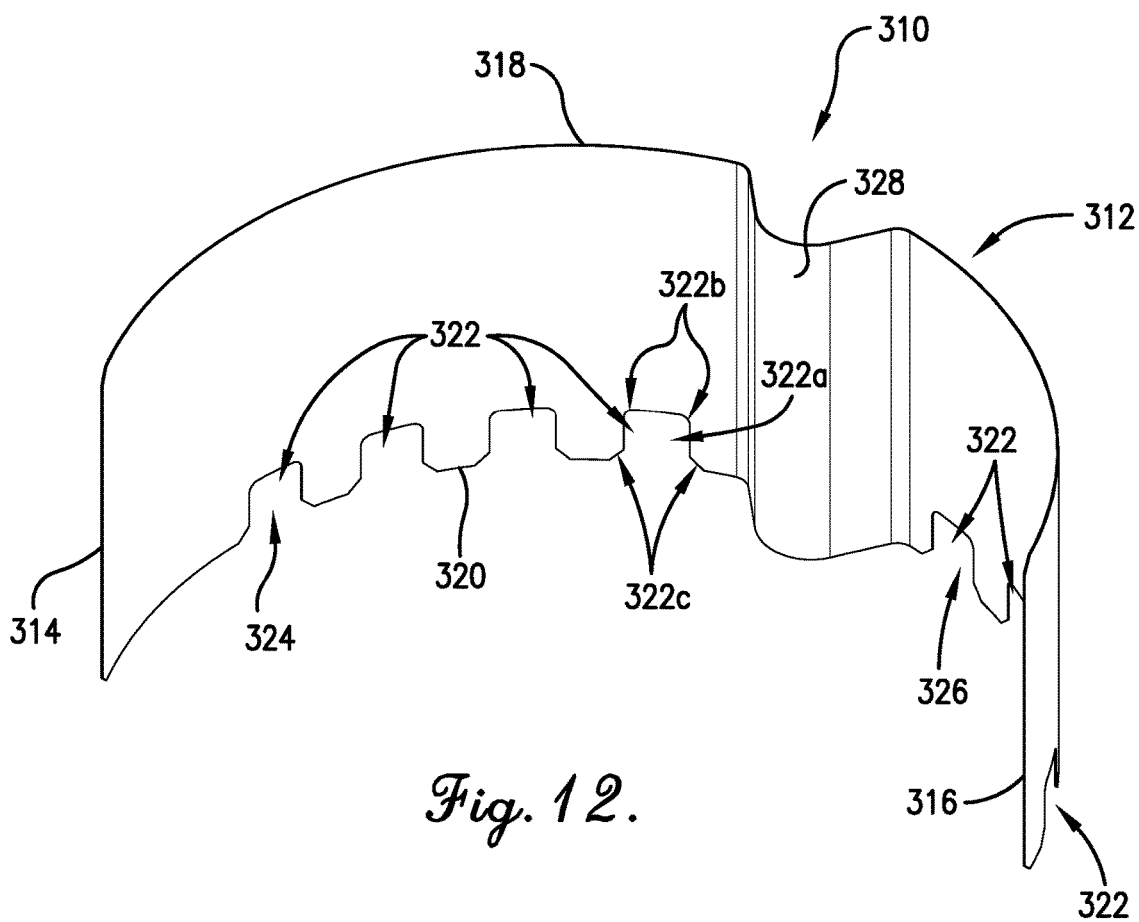
FIG. 12 is a top perspective view of an insulation system in accordance with a third preferred embodiment of the present invention.
Figure 13:
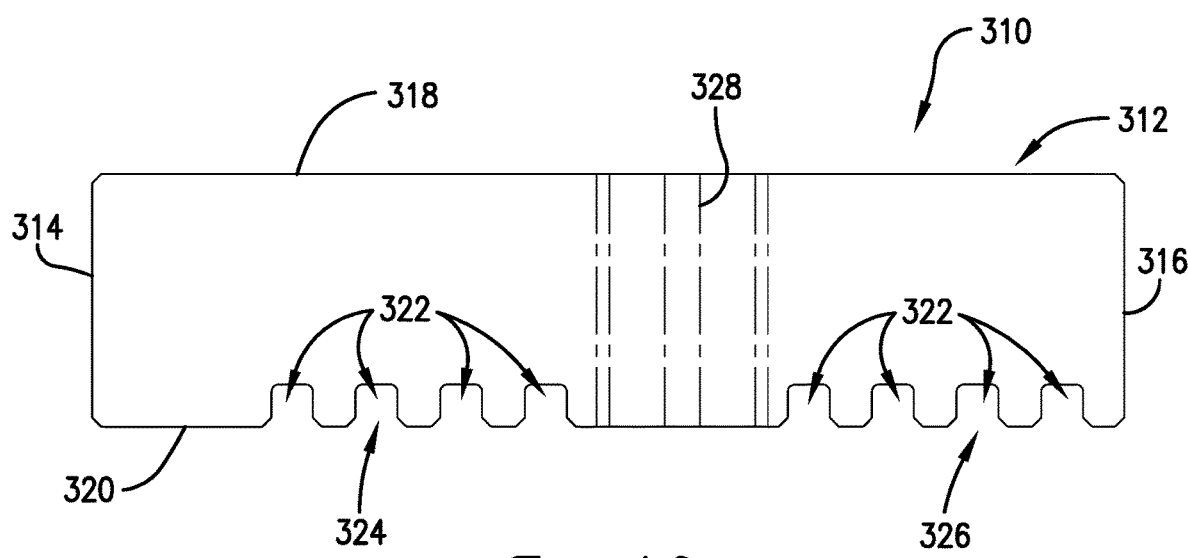
FIG. 13 is a decreased-scale side view of the insulation system as shown in FIG. 12, prior to forming.

A third preferred embodiment of the present invention is shown in FIGS. 12 and 13. It is initially noted that, with certain exceptions to be discussed in detail below, many of the elements of the insulation system 310 of the third embodiment are the same as or very similar to those described in detail above in relation to the insulation system 96 of the first embodiment. Therefore, for the sake of brevity and clarity, redundant descriptions and numbering will be generally avoided here. Unless otherwise specified, the detailed description of the elements presented above with respect to the first embodiment should therefore be understood to apply at least generally to the third embodiment, as well.

Similarly to the insulation system 96 of the first preferred embodiment, the insulation system 310 of the third preferred embodiment includes an insert 312. The insert 312 preferably extends arcuately to present arcuately spaced apart insert ends 314 and 316. The insert 312 also presents top and bottom edges 318 and 320, respectively, extending between and interconnecting the ends 314 and 316. A plurality of cutouts 322 extend axially upwardly from the bottom edge 320. The plurality of cutouts 322 are sized, shaped, and/or positioned within the insert 312 to facilitate efficient and convenient flow of potting fluid (not shown) into a controller can such as the controller can 38 of the first preferred embodiment.

In a preferred embodiment, the plurality of cutouts 322 includes a first set of cutouts 324 and a second set of cutouts 326. Alternatively, the plurality of cutouts can include one set of cutouts or more than two sets of cutouts. The cutouts of the first set cutouts 324 are preferably located extending between the end 314 and an insert projection 328. The cutouts of the second set of cutouts 326 are preferably located extending between the end 316 and the projection 328.

More particularly, the cutouts of the first set 324 are preferably evenly spaced from one another but collectively disposed nearer the projection 328 than the end 314. Likewise, the cutouts of the second set 326 are preferably evenly spaced from one another but collectively disposed nearer the projection 328 than the end 316. Uneven spacing relative to one another is permissible according to some aspects of the present invention, however. Furthermore, collective positioning of either or both sets nearer the respective end or evenly spaced between the projection and the respective end falls within the scope of some aspects of the present invention.

Preferably, the cutouts 322 are generally square or rectangular in form. Most preferably, the cutouts 322 include substantially square bodies 322a presenting rounded upper corners 322b. Inverted chamfered portions 22c preferably angle outwardly to form lower corners of the cutouts 322. Other shapes fall within the ambit of the present invention, however.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and access the reasonably fair scope of the present invention as pertains to any apparatus not materially departing from but outside the literal scope of the invention set forth in the following claims.

What is claimed is:
1. A motor assembly comprising:
a motor including a rotor rotatable about an axis, and a stator;
a controller for controlling at least one aspect of operation of the motor;
a housing defining a motor chamber at least substantially receiving the motor and a controller chamber at least substantially receiving the controller,
said housing including a generally annular sidewall at least in part defining the controller chamber,
said sidewall including an electrically conductive portion adjacent the controller, such that a generally radially extending potentially electrical pathway is defined between the controller and the electrically conductive portion; and
an insulation system extending along the electrically conductive portion, in electrically insulative engagement therewith, to at least in part obstruct the pathway,
said insulation system including an at least substantially electrically insulative insert,
said insert extending along and conforming to the electrically conductive portion, said insert being at least somewhat resiliently deformable and being at least in part secured in the housing via a self-generated spring force against the sidewall.

2. The motor assembly of claim 1, said insert comprising a substantially continuous sheet of insulative material.

3. The motor as claimed in claim 1,
said insert being secured to the housing by an adhesive.

4. The motor as claimed in claim 1,
said insert comprising polyethylene terephthalate.

5. The motor as claimed in claim 1,
said controller including a heat generator,
said housing including a heat sink engaging the heat generator along a heat transfer interface,
said insulation system being disposed in a non-overlapping manner relative to the heat transfer interface.

6. The motor as claimed in claim 5,
said insert extending arcuately to present arcuately spaced apart insert ends,
said heat transfer interface being disposed arcuately between the insert ends.

7. The motor as claimed in claim 6,
said heat sink including a plurality of heat-dissipating fins,
said heat-dissipating fins being disposed at least in part arcuately between the insert ends.

8. The motor as claimed in claim 1,
said sidewall extending continuously arcuately to define a cylindrical inner sidewall face,
said insulation system extending about and conforming to only a portion of said sidewall face.

9. The motor as claimed in claim 8,
said insulation system extending arcuately between about one hundred fifty and about two hundred ten degrees.

10. The motor assembly of claim 1,
said controller including a capacitor,
said pathway being defined between the capacitor and the electrically conductive portion.

11. The motor assembly of claim 10,
said controller including a plurality of electronic components spaced from the housing by a generally toroidal space,
said electronic components including the capacitor,
said capacitor being disposed adjacent the electrically conductive portion such that a minimum radial dimension of the space is defined therebetween.

12. The motor assembly of claim 10,
said capacitor being an electrolytic capacitor.

13. The motor assembly of claim 12,
said capacitor being an aluminum electrolytic capacitor.

14. The motor assembly of claim 1,
said controller including a printed circuit board and a plurality of electronics components mounted to said circuit board,
said sidewall at least substantially circumscribing the circuit board and the electronics components.

15. The motor assembly of claim 14,
said housing including an end wall adjacent the circuit board,
said sidewall extending generally axially from the end wall,
said insulation system including an at least substantially electrically insulative insert and a lining,
said insert extending along and conforming to the electrically conductive portion,
said lining disposed between the printed circuit board and the end wall.

16. The motor assembly of claim 15,
said lining comprising a discrete liner.

17. The motor as claimed in claim 1,
said housing including a controller can, a motor shell, and an endshield,
said controller can including the sidewall and an end wall,
said sidewall and said end wall cooperatively at least in part defining the controller chamber,
said motor shell and said endshield cooperatively at least in part defining the motor chamber.

18. The motor as claimed in claim 17,
said controller can including a fastener-receiving boss configured to receive a fastener for securing the controller can relative to the motor,
said insert including a projection contoured to extend along the boss in an overlying manner.

19. A motor assembly comprising:
a motor including a rotor rotatable about an axis, and a stator;
a controller for controlling at least one aspect of operation of the motor,
said controller including a printed circuit board and a plurality of electronics components mounted to said circuit board;
a housing defining a motor chamber at least substantially receiving the motor and a controller chamber at least substantially receiving the controller,
said housing including a generally annular sidewall at least in part defining the controller chamber,
said sidewall at least substantially circumscribing the circuit board and the electronics components,
said housing including an end wall adjacent the circuit board,
said sidewall extending generally axially from the end wall,
said sidewall including an electrically conductive portion adjacent the controller, such that a generally radially extending potentially electrical pathway is defined between the controller and the electrically conductive portion; and
an insulation system including an at least substantially electrically insulative insert and a lining,
said insert extending along and conforming to the electrically conductive portion, in electrically insulative engagement therewith, to at least in part obstruct the pathway,
said lining disposed between the printed circuit board and the end wall.

20. The motor assembly of claim 19,
said lining comprising a discrete liner.

* * * * *